Patented Feb. 22, 1949

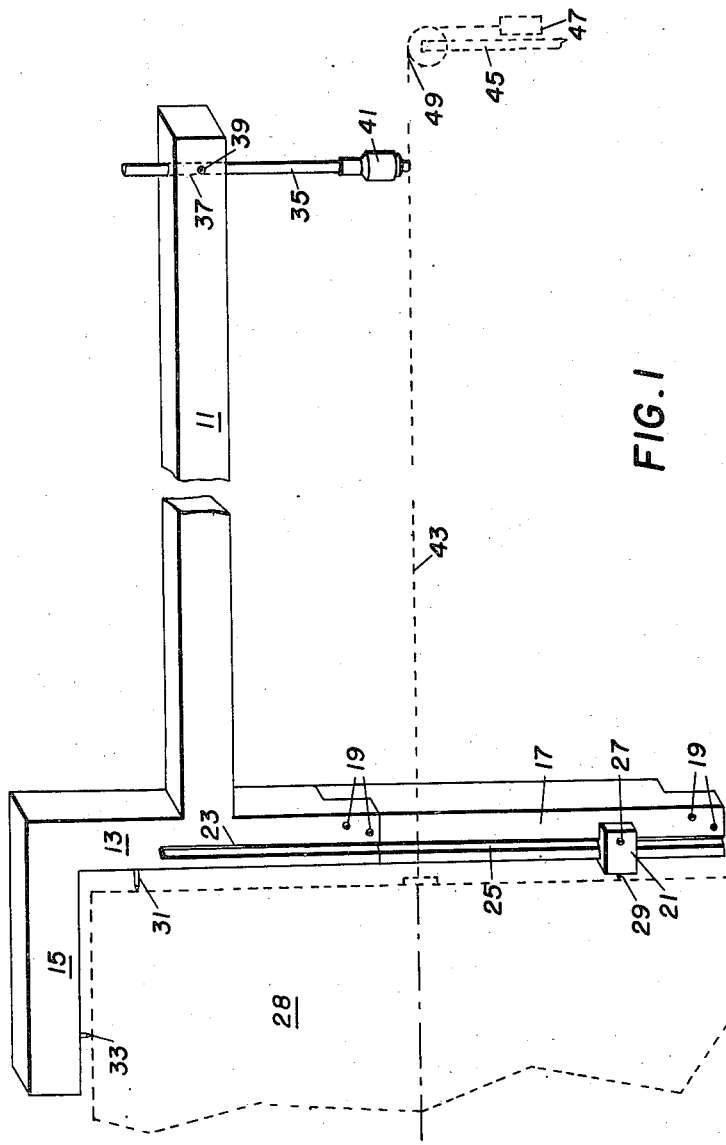

2,462,075

UNITED STATES PATENT OFFICE 2,462,075

T SQUARE GAUGE

John F. Donohue, Philadelphia, Pa.

Application November 7, 1946, Serial No. 708,366

1 Claim. (Cl. 33—180)

(Granted under the act of March 3, 1883, as amended April 30, 1928; 370 O. G. 757)

This invention relates to improvements in T-square gauges.

The primary object of the improvement is to provide a T-square gauge of simple and durable construction adapted to measure a wide range of radii.

Another object is to provide a T-square gauge adapted to square a centered wire to a coupling.

A further object is to provide a T-square gauge adapted to measure accurately the sag in a wire centered to a coupling.

Further objects and advantages of this invention, as well as its construction, arrangement and operation, will be apparent from the following description and claims in connection with the accompanying drawing, in which the single figure is an isometric view of a T-square gauge, showing a preferred embodiment of the invention.

The frame of the T-square gauge comprises a longitudinal bar 11 bearing a crosspiece or head 13 at an end thereof, and a leg portion 15 at an end of said head extending opposite said bar. Said head can include one or more extension bars 17 aligned with and adapted to elongate said head, and secured to said head or to an adjacent extension bar by a plurality of pins 19.

A carrier 21 engaged slidably in longitudinal grooves 23 of the head 13 and confluent longitudinal grooves 25 of the extension bars 17 is provided with a setscrew 27 adapted to secure said carrier in a predetermined fixed position. A contact point 29 is provided on the face of said carrier. A contact point 31 on the edge of the head 13 and a contact point 33 on the edge of the leg portion 15 adjacent said edge of the head cooperate with the contact point 29 to provide a three point contact with a coupling 28, the contact points 29 and 31 abutting spaced points on the face of the coupling as the contact point 33 touches a point on the periphery of said coupling.

A spindle 35 riding in a hole 37 proximate the end of the longitudinal bar 11 is extensible parallel to the head 13 and is secured in said longitudinal bar by setscrew 39. Said spindle carries measuring means such as a micrometer 41 at the end thereof.

The present device has many uses. For example, it may be desired to find a point lying on a continuation of the center line of a coupling and at a distance from said coupling. The operation then is as follows: The head of the T-square gauge is elongated with a desired plurality of extension bars and the carrier thereof secured in desired position. The spindle 35 and micrometer 41 are then set so that the point of the micrometer is adjacent a wire 43 hereinafter described, the spindle being horizontal and the leg 15 being on one side of the coupling, while the contact points 29 and 31 contact spaced points on the face of the coupling and the contact point 33 touches a point on the periphery of said coupling. The wire 43 is attached to the center of the coupling and carried over the crest 49 of a standard 45 and held taut by weight 47 beyond crest 49. The standard is moved until the wire 43, except for sag treated below, is in contact with the micrometer point for both horizontal positions of the spindle 35 (90° and 270° with the vertical). At such time the crest 49 is in a vertical plane containing the center line of the coupling.

The following steps retain the crest 49 in said vertical plane and bring said crest onto a continuation of the center line: Since the wire 43 extends a determinate distance to the crest 49 of the standard 45 and is subjected to a computable vertical sag over said distance when under tension of a known force 47, the vertical sag at the distance of the centerline of the spindle from the face of the coupling can be computed. Such computation is then added on the micrometer setting to the radius of the coupling theretofore indicated, and the standard is elevated or depressed a distance necessary to effect contact of the point of the micrometer with said wire. Under such conditions, the crest 49 of the said standard lies upon the true centerline of the said coupling.

Various modifications and changes can be made in the subject device without departing from the scope of the invention.

The invention described herein may be manufactured and used by or for the Government of the United States of America for governmental purposes without the payment of any royalties thereon or therefor.

I claim:

A T-square gauge comprising a longitudinal bar, a crosshead on said bar provided with longitudinal grooves and having a leg portion at an angle thereto extending opposite said bar, a first contact point on an edge of said crosshead, a carrier engaged slidably in said grooves of said crosshead, a second contact point on the face of said carrier, and a third contact point on the edge of said leg portion, said first and second contact points being adapted to contact the face of a coupling and said third contact point being adapted to contact the periphery of such coupling simultaneously, and an extensible micrometer mounted proximate the end of said longitudinal bar parallel to said crosshead.

JOHN F. DONOHUE.

REFERENCES CITED

The following references are of record in the file of this patent:

UNITED STATES PATENTS

| Number | Name | Date |
|---|---|---|
| 264,253 | Davis | Sept. 12, 1882 |
| 340,883 | Kells | Apr. 27, 1886 |
| 390,789 | Little | Oct. 9, 1888 |
| 435,089 | LeFrancois | Aug. 26, 1890 |
| 904,007 | O'Neill | Nov. 17, 1908 |
| 948,777 | Tuomi | Feb. 8, 1910 |
| 1,142,097 | Hill | June 8, 1915 |
| 1,308,681 | Prideaux | July 1, 1919 |
| 1,849,955 | Ro | Mar. 15, 1932 |
| 2,397,795 | Lersch | Apr. 2, 1946 |

FOREIGN PATENTS

| Number | Country | Date |
|---|---|---|
| 518,446 | Germany | Feb. 16, 1931 |
| 634,186 | Germany | Aug. 22, 1936 |
| 748,884 | France | Apr. 25, 1933 |